United States Patent [19]
Anda et al.

[11] Patent Number: 5,829,555
[45] Date of Patent: Nov. 3, 1998

[54] DISC BRAKE CALIPER ASSEMBLY

[75] Inventors: Hiroshi Anda, Nagoya; Toru Shimizaki, Hazu-gun; Morimasa Takewaki, Anjo, all of Japan

[73] Assignee: Aisin Seiki Kabushiki Kaisha, Kariya, Japan

[21] Appl. No.: 810,818

[22] Filed: Mar. 6, 1997

[51] Int. Cl.$^6$ ............................. F16D 65/40; F16D 55/22
[52] U.S. Cl. ...................... 188/73.38; 188/72.3; 188/72.5
[58] Field of Search ................................ 188/72.5, 73.38, 188/73.37, 73.36, 73.35, 216, 72.3, 73.39, 205 A, 73.43, 73.46, 73.47, 73.32, 73.45, 250 E

[56] References Cited

U.S. PATENT DOCUMENTS

| | | | |
|---|---|---|---|
| 3,783,980 | 1/1974 | Kallmeyer | 188/73.38 |
| 3,841,444 | 10/1974 | Baum et al. | |
| 4,219,105 | 8/1980 | Delaunay | 188/73.38 |
| 4,342,381 | 8/1982 | Tamura | 188/73.38 |
| 4,417,647 | 11/1983 | Cotter et al. | 188/73.38 |
| 5,251,727 | 10/1993 | Loeffler et al. | |

FOREIGN PATENT DOCUMENTS

| | | |
|---|---|---|
| 1 931 752 | 1/1971 | Germany . |
| 2 151 044 | 4/1973 | Germany . |
| 2 225 178 | 1/1974 | Germany . |
| 5-45266 | 6/1993 | Japan . |
| 2 245 322 | 1/1992 | United Kingdom . |

Primary Examiner—Douglas C. Butler
Attorney, Agent, or Firm—Burns, Doane, Swecker & Mathis, LLP

[57] ABSTRACT

A disc brake caliper assembly for use with a disc rotor includes first and second opposed pads positionable on opposite sides of the disc rotor and movable towards and away from one another to apply a braking force to the disc rotor during braking operation, and a stationary member which receives a braking torque from the pads during the braking operation. A single pad-supporting pin has opposite ends that are supported by the stationary member, and the single pad-supporting pin is adapted to support the pads in the radial direction. The pad-supporting pin is located at a position offset from the center of each of the first and second pads. A one-piece spring member is supported on the stationary member. The one-piece spring member includes a first spring portion for applying a biasing force to the first pad having an axially directed component for biasing the first pad axially outwardly away from the second pad when the braking operation ceases and a radially directed component for biasing the first pad radially inwardly to prevent the first pad from rattling. The one-piece spring member also includes a second spring portion for applying a biasing force to the second pad having an axially directed component for biasing the first pad axially outwardly away from the first pad when the braking operation ceases and a radially directed component for biasing the second pad radially inwardly to prevent the second pad from rattling.

20 Claims, 3 Drawing Sheets

DISC BRAKE CALIPER ASSEMBLY

FIELD OF THE INVENTION

The present invention generally relates to brake assemblies and more particularly concerns a disc brake caliper assembly for use with a disc rotor.

BACKGROUND OF THE INVENTION

Japanese Utility Model Application Laid-Open No. Hei 5-45266 discloses a disc brake caliper assembly for use with a disc rotor. The disc brake caliper assembly includes first and second opposed pads for being positioned at opposite sides of the disc rotor and movable toward and away from the disc rotor, a stationary member for receiving braking torque from the pads during a braking operation, and a single pad-supporting pin centrally located with respect to the pads in a rotational direction of the disc rotor for supporting the pads in a radial direction of the disc rotor. The disc brake caliper assembly further includes a pair of spring members for moving the pads away from the disc rotor upon releasing the braking operation to reduce drag braking torque. Each of the spring members is located at a position offset from the center with respect to the pad in the rotational direction of the disc rotor.

The arrangement including the pair of spring member for moving the pads away from the disc rotor upon release of the braking operation increases the cost of the disc brake caliper assembly. If one of the spring members is omitted to reduce the cost of the disc brake caliper assembly, a portion of each pad remote from the spring in a rotational direction of the disc rotor remains in engagement with the disc rotor upon releasing the braking operation. This undesirably increases the level of drag braking torque and causes an abnormal wear on the pads.

SUMMARY OF THE INVENTION

In light of the foregoing, a need exists for a disc brake caliper assembly that possesses a low level of drag braking torque.

It would also be desirable to provide a disc brake caliper assembly that is less expensive to produce as compared to other known types of disc brake caliper assemblies.

In accordance with one aspect of the present invention, a disc brake caliper assembly for use with a disc rotor includes first and second opposed pads for being positioned on opposite sides of the disc rotor and for being moved towards and away from the disc rotor, and a stationary member for receiving braking torque from the pads upon a braking operation. A single pad-supporting pin is supported at both ends by the stationary member and movably penetrates the pads for supporting the pads in the radial direction of the disc rotor. The pad-supporting pin is located at a position offset from the centers of the pads. A spring member has a base portion that is located at a position offset from the centers of the pads in the rotational direction of the disc rotor. The spring member includes first and second spring portions connected to one end of the base portion and aligned with the centers of the pads. The middle portion of the base portion of the spring member is operatively connected to or engaged with a middle portion of the pad-supporting pin. The opposite end of the base portion resiliently abuts a radially outwardly facing surface of the stationary member. The first spring portion resiliently abuts the first pad and axially biases the first pad for moving the first pad away from the disc rotor upon releasing the braking operation. The second spring portion resiliently abuts the second pad and axially biases the second pad for moving the second pad away from the disc rotor upon releasing the braking operation.

According to another aspect of the present invention, a disc brake caliper assembly for use with a disc rotor includes first and second opposed pads positionable on opposite sides of the disc rotor and movable towards and away from one another to apply a braking force to the disc rotor during braking operation, and a stationary member which receives a braking torque from the pads during the braking operation. A single pad-supporting pin has opposite ends that are supported by the stationary member. The single pad-supporting pin penetrates the first and second pads for supporting the first and second pads in the radial direction, and the pad-supporting pin is located at a position offset from the center of each of the first and second pads. A one-piece spring member is supported on the stationary member. The one-piece spring member includes a first spring portion for applying a biasing force to the first pad having an axially directed component for biasing the first pad axially outwardly away from the second pad when the braking operation ceases and a radially directed component for biasing the first pad radially inwardly to prevent the first pad from rattling. The one-piece spring member also includes a second spring portion for applying a biasing force to the second pad having an axially directed component for biasing the first pad axially outwardly away from the first pad when the braking operation ceases and a radially directed component for biasing the second pad radially inwardly to prevent the second pad from rattling.

BRIEF DESCRIPTION OF THE DRAWING FIGURES

The foregoing and other features associated with the present invention will become more apparent from the following detailed description considered with reference to the accompanying drawing figures in which like elements are designated by like reference numerals and wherein.

DETAILED DESCRIPTION OF PREFERRED EMBODIMENTS

Figure 1:
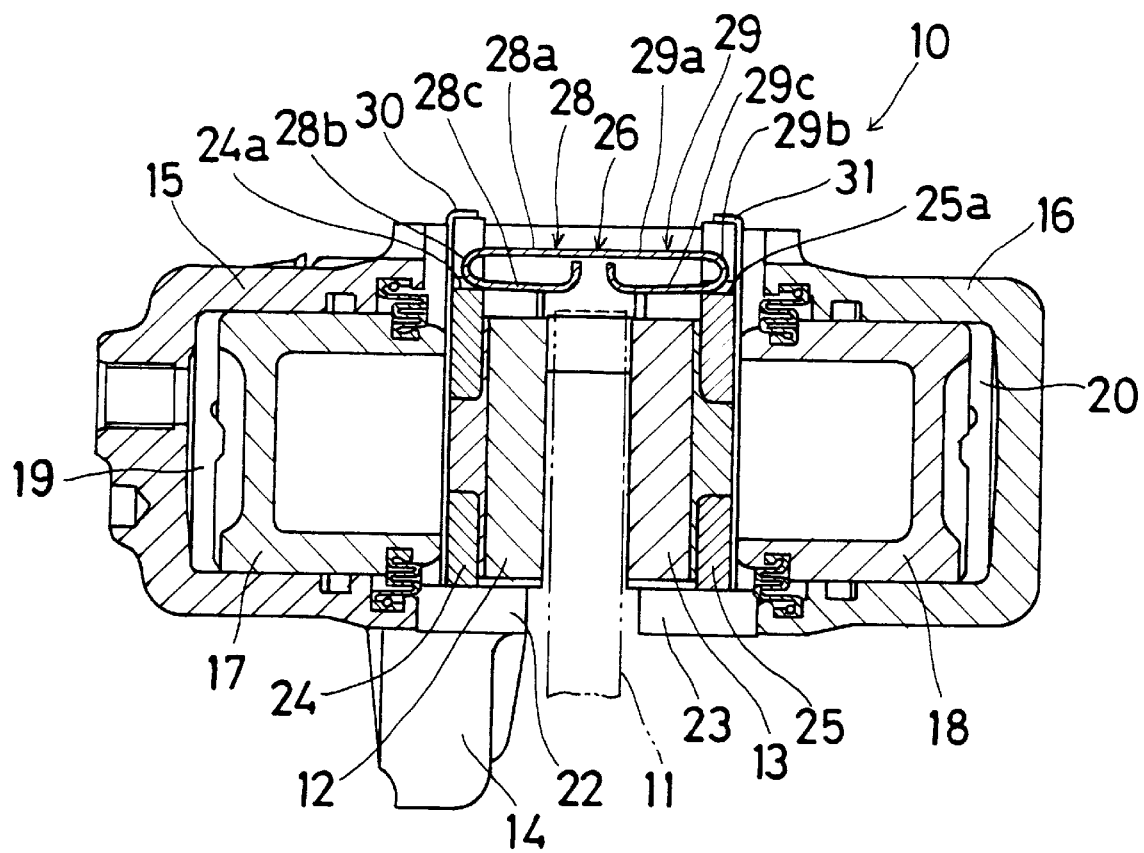
FIG. 1 is a cross-sectional view of the disc brake caliper assembly according to the present invention.

FIGS. 1–4 illustrate one embodiment of a disc brake caliper assembly 10 according to the present invention for use with a disc rotor 11. The disc brake caliper assembly 10 includes a first pad 12 and a second pad 13 that are positioned in opposing relation to one another for being positioned on opposite sides of the disc rotor 11 as shown in FIG. 1. The first and second brake pads 12, 13 are movable towards and away from the disc rotor 11. In addition, as seen in FIG. 1, the first pad 12 is provided with a backing plate 24 and the second pad 13 is provided with a backing plate 25.

The disc brake caliper assembly also includes a stationary member 14 which receives the braking torque from the pads 12, 13 during a braking operation. The stationary member 14 is provided with a first cylinder 15 and a second cylinder 16. A first piston 17 is received in first cylinder 15 and a second piston 18 is received in the second cylinder 16 to define first and second braking pressure chambers 19, 20 in the first and second cylinders 15, 16, respectively. The pistons 17, 18 are adapted to be moved by braking pressure supplied to the respective braking pressure chambers 19, 20. The pads 12, 13 are moved towards the disc rotor 11 by the pistons 17, 18 respectively for applying a braking force or torque to the disc rotor 11.

A single pad-supporting pin 21, a pair of first stoppers 22, and a pair of second stoppers 23 are provided on the stationary member 14 for supporting the first and second pads 12, 13 in the radial direction of the disc rotor 11. The pad-supporting pin 21 is located at a position that is offset from a centrally located position with respect to the pads 12, 13. More specifically, the pad-supporting pin 21 is offset in the direction towards the normal rotational direction of the disc rotor 11, which is shown by the arrow in FIG. 2. Both ends of the pad-supporting pin 21 are received in holes provided on the stationary member 14 so that both ends of the pad-supporting pin 21 are supported by the stationary member 14. The pad-supporting pin 21 also movably penetrates the backing plate 24 of the first pad 12 as well as the backing plate 25 of the second pad 13.

The first stoppers 22 movably support the edge of the first pad 12 facing inwardly in the radial direction of the disc rotor 11 for preventing the first pad 12 from undergoing radially inwardly directed movement about the pad-supporting pin 21 during braking. The second stoppers 23 movably support the edge of the second pad 13 facing inwardly in the radial direction of the disc rotor 11 for preventing the second pad 13 from undergoing radially inwardly directed movement about the pad-supporting pin 21 during braking.

The disc brake caliper assembly also include a spring member 26 made of sheet metal material. The spring member 26 limits the sliding movement of the pad-supporting pin 21 relative to the stationary member 14. The spring member 26 axially biases the center of the first pad 12 and the center of the second pad 13 with respect to the rotational direction of the disc rotor 11 to move the pads 12, 13 away from the disc rotor 11 when the braking operation ceases. The spring member 26 also applies a biasing force to the first and second pads 12, 13 in the radially inwardly directed direction of the disc rotor 11 to prevent the pads 12, 13 from rattling.

Figure 2:
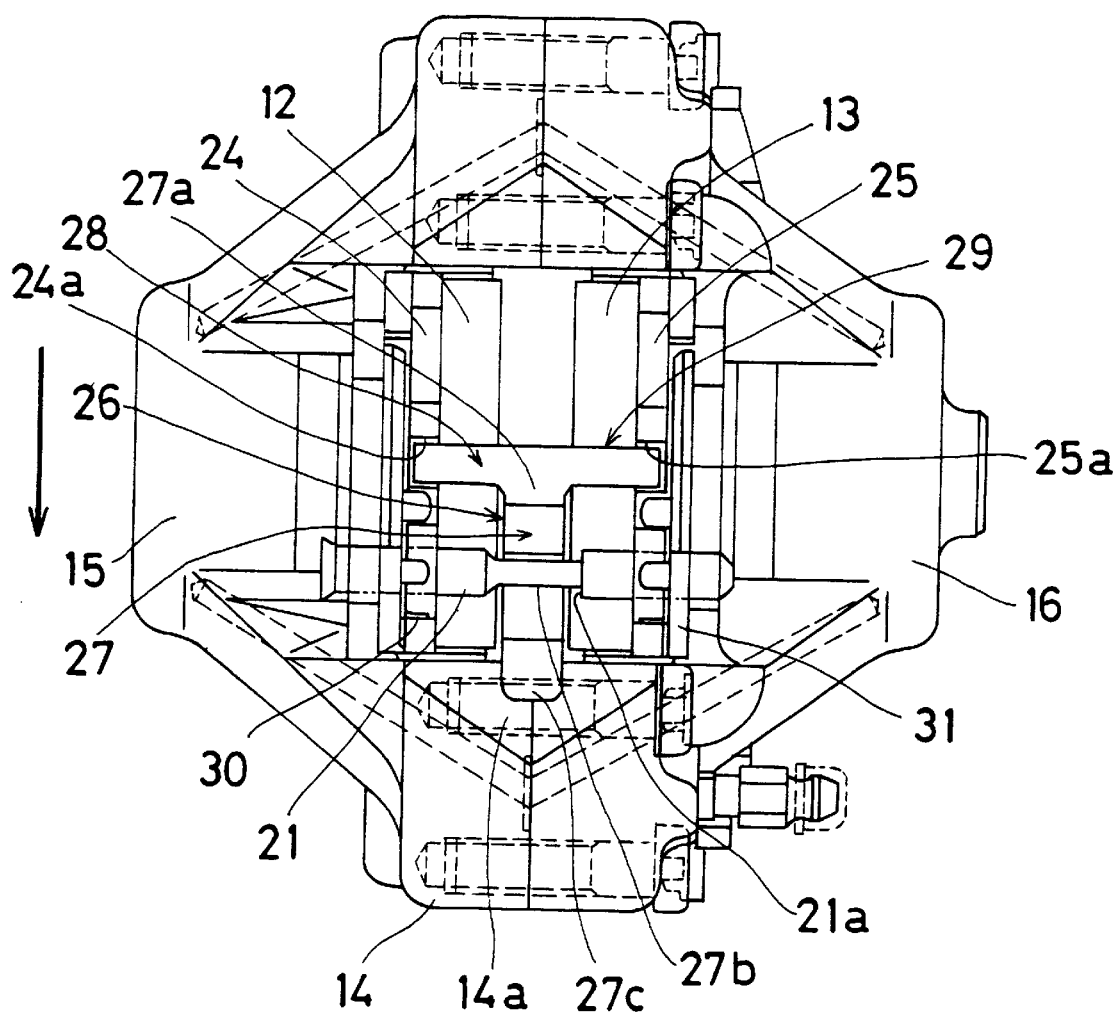
FIG. 2 is a top view of the disc brake caliper assembly depicted in FIG. 1.
Figure 3:
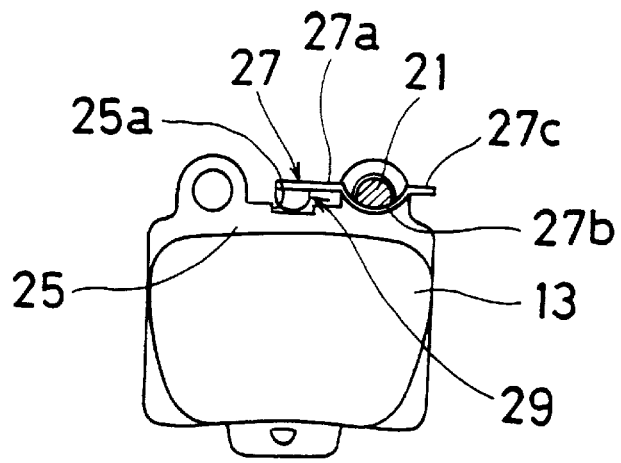
FIG. 3 is a side view illustrating a portion of the disc brake caliper assembly shown in FIG. 1 and depicting the relationship between the pad, the pad-supporting pin and the spring member.

The spring member 26 has a base portion 27 which, as seen in FIG. 2, is located at a position that is offset from the centers of the pads 12, 13 (i.e., planes passing through centers of the pads 12, 13 and extending perpendicular to the plane of the paper with reference to the illustration in FIG. 2). The base portion 27 is offset from the centers of the pads 12, 13 in the normal rotational direction of the disc rotor 11.

The spring member 26 also has first and second spring portions 28, 29 that are connected to one end 27a of the base portion 27. The first and second spring portions 28, 29 extend axially outwardly from the base portion 27 and are located at the centers of the pads 12, 13. That is, the first and second spring portions 28, 29 are generally aligned with a plane extending perpendicular to the plane of the paper with reference to the illustration in FIG. 2.

A curved intermediate or middle portion 27b of the base portion 27 is located radially inwardly of the pad-supporting pin 21 (i.e., extends underneath the pad-supporting pin 21) and is received in a recess 21a in the form of an annular groove or smaller diameter portion provided in the middle or intermediate portion of the pad-supporting pin 21. Thus, the intermediate or middle portion 27b of the base portion 27 is operatively engaged with the middle or intermediate portion of the pad-supporting pin 21. The opposite end 27c of the base portion 27 resiliently abuts the surface 14a of the stationary member 14 that faces radially outwardly with respect to the disc rotor 11.

The first spring portion 28 of the spring member 26 includes a generally straight first portion 28a extending in the axial direction of the disc rotor 11 from the base portion 27 towards the first pad 12, a rounded or curved second portion 28b that extends radially inwardly with respect to the rotational direction of the disc rotor 11 from the extreme end of the first portion 28a, and a generally straight third portion 28c extending in the axial direction of the disc rotor 11 from the extreme end of the second portion 28b towards the base portion 27. The third portion 28c also extends radially inwardly with respect to the rotational direction of the disc rotor 11 from the extreme end of the second portion 28b.

Figure 4:
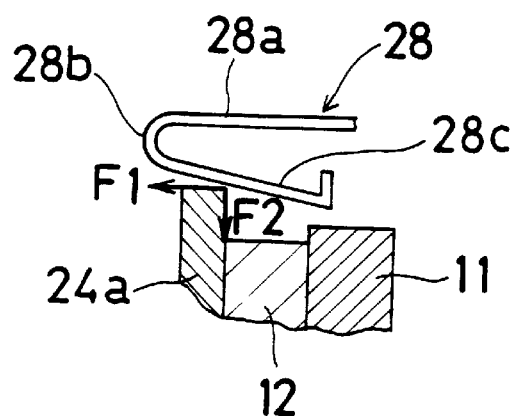
FIG. 4 is an enlarged cross-sectional view of a portion of the disc brake caliper assembly depicted in FIG. 1 showing the relationship between the pad and the spring member.

The third portion 28c of the first spring portion 28 is received in a recess 24a provided on the backing plate 24 of the first pad 12. The third portion 28c of the first spring portion 28 resiliently abuts the bottom surface of the recess 24a that faces radially outwardly of the disc rotor 11 and applies both an axial biasing force F1 and a radially inwardly directed biasing force F2 to the first pad 12 as shown as shown in FIG. 4.

The second spring portion 29 of the spring member 26 includes a generally straight first portion 29a extending in the axial direction of the disc rotor 11 from the base portion 27 towards the second pad 13, a curved or rounded second portion 29b extending radially inwardly with respect to the disc rotor 11 from the extreme end of the first portion 29a, and a generally straight third portion 29c extending in the axial direction of the disc rotor 11 from the extreme end of the second portion 29b towards the base portion 27. The third portion 29c of the second spring portion 29 also extends radially inwardly from the extreme end of the second portion 29b.

The third portion 29c of the second spring portion 29 is received in a recess 25a that is provided on the backing plate 25 of the second pad 13. The third portion 29c of the second spring portion 29 resiliently abuts the bottom surface of the recess 25a that faces radially outwardly of the disc rotor 11. The third portion 29c of the second spring portion 29 thus applies an axial biasing force to the second pad 13 in a direction opposite the direction of the axial biasing force F1 applied by the third portion 28c of the first spring portion 28. Additionally, the third portion 29c of the second spring portion 29 applies a radially inwardly directed biasing force to the second pad 13 that corresponds to the radial force F2 applied by the third portion 28c of the first spring portion 28 to the first pad 12.

The axial forces applied by the third portion 28c of the first spring portion 28 and the third portion 29c of the second spring portion 29 function to axially bias the first pad 12 and the second pad 13 with respect to the rotational direction of the disc rotor 11 to move the pads 12, 13 away from the disc rotor 11 when the braking operation ceases. In addition, the radial forces applied by the third portion 28c of the first spring portion 28 and the third portion 29c of the second spring portion 29 function to radially bias the first and second pads 12, 13 in the radially inwardly directed direction of the disc rotor 11 to prevent the pads 12, 13 from rattling.

As shown in FIGS. 1 and 2, a shim member 30 is interposed between the backing plate 24 of the first pad 12 and the piston 17. In addition, a shim member 31 is interposed between the backing plate 25 of the second pad 13 and the piston 18. The pad-supporting pin 21 movably penetrates the shim members 30 and 31.

Figure 5:
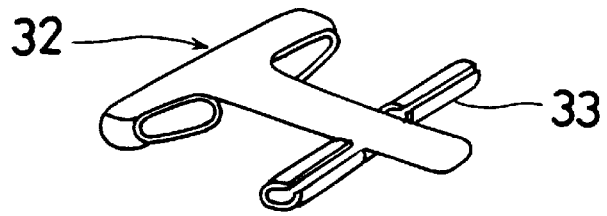
FIG. 5 is a perspective view of a spring member and a pad-supporting pin different from those shown in FIGS. 1–4.

In the construction of the disc brake caliper assembly 10 described above, the spring member 26 and the pad-supporting pin 21 constitute separate elements. However, as shown in FIG. 5, the separate spring member 26 and pad-supporting pin 21 can be replaced by a spring member 32 having a pad-supporting pin 33 integrally formed therewith. In the embodiment shown in FIG. 5, the spring member 32 and the pad-supporting pin 33 are integrally formed in one piece from a sheet metal material.

By virtue of the construction of the disc brake caliper assembly 10 described above, the necessary axial and radial biasing forces can be imparted to the brake pads while at the same time reducing the cost of the disc brake caliper assembly as compared to other known assemblies. In addition, the reduction in cost of the assembly does not result in a construction of the assembly that is susceptible of rattling. Further, significant drag braking torque problems do not arise and abnormal pad wear does not occur.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A disc brake caliper assembly for use with a disc rotor comprising;

first and second opposed pads for being positioned on opposite sides of the disc rotor, the first and second pads being movable towards and away from one another to apply a braking force to the disc rotor;

a stationary member for receiving a braking torque from the pads during a braking operation;

a single pad-supporting pin having opposite ends that are supported by the stationary member, the single pad-supporting pin penetrating the first and second pads for supporting the first and second pads in a radial direction, said pad-supporting pin being located at a position offset from a center of each of the first and second pads; and a spring member having a base portion that is located at a position offset from the center of each of the first and second pads, and first and second spring portions connected to one end of the base portion, the first and second spring portions being aligned with the center of each of the first and second pads, the base portion of the spring member having a middle portion that is operatively engaged with a middle portion of the pad-supporting pin and having an end opposite said one end that resiliently abuts a surface of the stationary member which faces radially outwardly, the first spring portion resiliently urging the first pad in an axial direction for moving the first pad away from the disc rotor when the braking operation is released, and the second spring portion resiliently urging the second pad in an axial direction for moving the second pad away from the disc rotor when the braking operation is released.

2. A disc brake caliper assembly according to claim 1, wherein the first spring portion of the spring member biases the first pad towards the radially inward direction, and the second spring portion of the spring member biases the second pad towards the radially inward direction.

3. A disc brake caliper assembly according to claim 1, wherein the middle portion of the base portion of the spring member is positioned radially inwardly of the pad-supporting pin, and the middle portion of the pad-supporting pin is provided with a recess which receives the middle portion of the base portion for operatively engaging the middle portion of the base portion of the spring member with the middle portion of the pad-supporting pin.

4. A disc brake caliper assembly according to claim 2, wherein the first spring portion of the spring member includes a first portion extending in an axial direction towards the first pad, a curved second portion extending radially inwardly from an extreme end of the first portion, and a third portion extending in the axial direction from an extreme end of the second portion towards the base portion, the third portion of the first spring portion also extending radially inwardly from the extreme end of the second portion, the third portion of the first spring portion resiliently abutting a radially outwardly facing portion of the first pad, the second spring portion of the spring member including a first portion extending in the axial direction from the base portion towards the second pad, a curved second portion extending radially inwardly from an extreme end of the first portion of the second spring portion, and a third portion extending in the axial direction from an extreme end of the second portion of the second spring portion towards the base portion, the third portion of the second spring portion also extending radially inwardly from the extreme end of the second portion of the second spring member, the third portion of the second spring portion resiliently abutting a radially outwardly facing portion of the second pad.

5. A disc brake caliper assembly according to claim 4, wherein the first pad is provided with a recess that receives the third portion of the first spring portion of the spring member, and the second pad is provided with a recess that receives the third portion of the second spring portion of the spring member.

6. A disc brake caliper assembly according to claim 1, wherein the pad-supporting pin and the spring member are formed as one piece.

7. A disc brake caliper assembly according to claim 1, wherein the pad-supporting pin and the spring member are formed as separate elements.

8. A disc brake caliper assembly according to claim 1, including first and second opposed cylinders provided on the stationary member, a first piston received in the first cylinder to define a first braking pressure chamber in the first cylinder, a second piston received in the second cylinder to define a second braking pressure chamber in the second cylinder, the first and second pistons being moved by braking pressure supplied to the first and second braking pressure chambers respectively, the first and second pads being moved towards one another by the first and second pistons respectively.

9. A disc brake caliper assembly according to claim 1, including a pair of first stoppers and a pair of second stoppers provided on the stationary member, the first stoppers movably supporting a radially inwardly facing portion of the first pad, the second stoppers movably supporting a radially inwardly facing portion of the second pad.

10. A disc brake caliper assembly for use with a disc rotor comprising;

first and second opposed pads for being positioned on opposite sides of the disc rotor, the first and second pads being movable towards and away from one another to apply a braking force to the disc rotor during braking operation;

a stationary member for receiving a braking torque from the pads during the braking operation;

a single pad-supporting pin having opposite ends that are supported by the stationary member, the single pad-supporting pin penetrating the first and second pads for supporting the first and second pads in a radial direction, said pad-supporting pin being located at a position offset from a center of each of the first and second pads; and a one-piece spring member supported on the stationary member, the one-piece spring member including a first spring portion for applying a biasing force to the first pad having an axially directed component for biasing the first pad axially outwardly away from the second pad when the braking operation ceases and a radially directed component for biasing the first pad radially inwardly to prevent the first pad from rattling, the one-piece spring member also including a second spring portion for applying a biasing force to the second pad having an axially directed component for biasing the first pad axially outwardly away from the first pad when the braking operation ceases and a radially directed component for biasing the second pad radially inwardly to prevent the second pad from rattling.

11. A disc brake caliper assembly according to claim 10, wherein the spring member includes a base portion having opposite ends and an intermediate portion, the first and second spring portions extending from one of the ends of the base portion.

12. A disc brake caliper assembly according to claim 11, wherein the intermediate portion of the base portion of the spring member is positioned radially inwardly of the pad-supporting pin, the pad-supporting pin being provided with a recess which receives the intermediate portion of the base portion for operatively engaging the intermediate portion of the base portion of the spring member with the pad-supporting pin.

13. A disc brake caliper assembly according to claim 11, wherein the first spring portion of the spring member includes a first portion extending in an axial direction towards the first pad, a curved second portion extending radially inwardly from an extreme end of the first portion, and a third portion extending in the axial direction from an extreme end of the second portion towards the base portion, the third portion of the first spring portion also extending radially inwardly from the extreme end of the second portion, the third portion of the first spring portion resiliently abutting a radially outwardly facing portion of the first pad.

14. A disc brake caliper assembly according to claim 13, wherein the first pad is provided with a recess that receives the third portion of the first spring portion of the spring member.

15. A disc brake caliper assembly according to claim 11, wherein the second spring portion of the spring member includes a first portion extending in the axial direction from the base portion towards the second pad, a curved second portion extending radially inwardly from an extreme end of the first portion of the second spring portion, and a third portion extending in the axial direction from an extreme end of the second portion of the second spring portion towards the base portion, the third portion of the second spring portion also extending radially inwardly from the extreme end of the second portion of the second spring member, the third portion of the second spring portion resiliently abutting a radially outwardly facing portion of the second pad.

16. A disc brake caliper assembly according to claim 15, wherein the second pad is provided with a recess that receives the third portion of the second spring portion of the spring member.

17. A disc brake caliper assembly according to claim 10, wherein the pad-supporting pin and the spring member are formed as one piece.

18. A disc brake caliper assembly according to claim 10, wherein the pad-supporting pin and the spring member are formed as separate elements.

19. A disc brake caliper assembly according to claim 10, including first and second stoppers provided on the stationary member, the first stopper movably supporting a radially inwardly facing portion of the first pad for preventing the first pad from pivoting about the pad-supporting pin in a radially inward direction, the second stopper movably supporting a radially inwardly facing portion of the second pad for preventing the second pad from pivoting about the pad-supporting pin in a radially inward direction.

20. A disc brake caliper assembly according to claim 10, wherein the spring member includes a base portion having opposite ends and an intermediate portion located between the opposite ends, the first and second spring portions extending from one of the ends of the base portion, the opposite end of the base portion resiliently abutting a surface of the stationary member which faces radially outwardly, the intermediate portion of the base portion of the spring member being operatively engaged with the pad-supporting pin.

* * * * *

UNITED STATES PATENT AND TRADEMARK OFFICE
CERTIFICATE OF CORRECTION

PATENT NO. : 5,829,555
DATED : November 3, 1998
INVENTOR(S) : ANDA, et al.

It is certified that error appears in the above-indentified patent and that said Letters Patent is hereby corrected as shown below: On the title page, item [75], second inventor should read--

Toru SHIMAZAKI

Signed and Sealed this

Twenty-ninth Day of June, 1999

Attest:

Q. TODD DICKINSON

Attesting Officer

Acting Commissioner of Patents and Trademarks